United States Patent [19]

Pinkston et al.

[11] Patent Number: 5,366,799
[45] Date of Patent: Nov. 22, 1994

[54] PRINTING BLANKET HAVING SMOOTH NONTEXTURED BASE SURFACE

[75] Inventors: Melvin D. Pinkston, Hendersonville; Stephen B. Edwards, Hazelwood, both of N.C.

[73] Assignee: Day International, Inc., Dayton, Ohio

[21] Appl. No.: 982,958

[22] Filed: Nov. 30, 1992

Related U.S. Application Data

[60] Continuation-in-part of Ser. No. 637,817, Jan. 7, 1991, abandoned, which is a division of Ser. No. 282,387, Dec. 9, 1988, Pat. No. 5,006,400.

[51] Int. Cl.$^5$ ............... B32B 7/00; D03D 15/00
[52] U.S. Cl. ............... 428/250; 428/246; 428/261; 428/262; 428/265; 428/909
[58] Field of Search ............... 428/909, 250, 261, 262, 428/265, 246

[56] References Cited

U.S. PATENT DOCUMENTS

| | | |
|---|---|---|
| 2,064,780 | 12/1936 | Calvert . |
| 2,752,280 | 6/1956 | Cooke et al. . |
| 3,147,698 | 9/1964 | Ross . |
| 3,186,894 | 6/1965 | Liles et al. . |
| 3,616,145 | 10/1971 | Clifton . |
| 3,795,568 | 3/1974 | Rhodarmer et al. . |
| 3,802,952 | 4/1974 | Gurin et al. . |
| 3,983,287 | 9/1976 | Goossen et al. . |
| 4,034,671 | 7/1977 | Bach . |
| 4,093,764 | 6/1978 | Duckett et al. . |
| 4,219,595 | 8/1980 | Spöning . |
| 4,425,398 | 1/1984 | Berczi . |
| 4,469,729 | 9/1984 | Watanabe et al. . |
| 4,471,011 | 9/1984 | Sponing . |
| 4,548,858 | 10/1985 | Meadows . |
| 4,603,631 | 8/1986 | Simeth . |
| 4,751,127 | 6/1988 | Pinkston et al. . |
| 5,006,400 | 4/1991 | Pinkston et al. . |

FOREIGN PATENT DOCUMENTS 0209198 11/1984 Japan .
0124993 6/1987 Japan .

Primary Examiner—Jenna L. Davis
Assistant Examiner—Terrel Morris
Attorney, Agent, or Firm—Killworth, Gottman, Hagan & Schaeff

[57] ABSTRACT

A printing blanket which requires no packing when installed and which has a nontextured, substantially smooth and low abrasion base surface contacting the blanket cylinder so that the pressures to which the blanket is subjected are spread substantially over the entire surface of the blanket in contact with the blanket cylinder is provided. The laminated printing blanket construction includes at least one base ply and a surface layer. The exterior surface of the base ply is coated with an elastomer to provide the substantially smooth surface. The blanket eliminates mechanical abrasion of the blanket cylinder surface with which it is in contact.

9 Claims, 1 Drawing Sheet

PRINTING BLANKET HAVING SMOOTH NONTEXTURED BASE SURFACE

CROSS-REFERENCE TO RELATED APPLICATIONS

This application is a continuation-in-part of U.S. application Ser. No. 637,817, filed Jan. 7, 1991, now abandoned, which is itself a divisional of U.S. application Ser. No. 282,387, filed Dec. 9, 1988, now U.S. Pat. No. 5,006,400.

BACKGROUND OF THE INVENTION

This invention relates to a printing blanket, and more particularly to a printing blanket having a substantially smooth, nontextured, low abrasion base surface which contacts the cylinder on which the blanket is mounted. The type of blanket referred to herein is used primarily in offset lithographic printing, but may also find utility in other fields of printing.

In offset lithography, a rotary cylinder is covered with a printing plate which normally has a positive image area receptive to oil-based inks and repellent to water and a background area where the opposite is true. The printing plate is rotated so that its surface contacts a second cylinder covered with a rubber-surfaced ink-receptive printing blanket. The ink present on the image surface of the printing plate transfers, or offsets, to the surface of the blanket. Paper or other sheet stock to be printed is then passed between the blanket-covered cylinder and a rigid back-up cylinder to transfer the image from the surface of the blanket to the paper.

During the step in which the image is transferred from the plate to the blanket and the step where the image is transferred from the printing blanket to the paper, it is important to have intimate contact between the two contacting surfaces. This is ordinarily achieved by positioning the blanket-covered cylinder and the supporting cylinder it contacts so that there is a fixed interference between the two so that the blanket is compressed throughout the run to a fixed depth, typically approximately 0.002 to 0.004 inches. It is important that this compression be maintained uniformly over the entire surface of the blanket.

Conventionally, this fixed interference is accomplished by inserting one or more thin layers of paper or the like between the blanket and the stirface of the cylinder to build up the thickness of the blanket. This process is known as packing a blanket. This process presents problems however in that the packing procedure is time consuming, resulting in down time for the printing equipment. Further, once positioned on the cylinder, the packing paper tends to slide, slip, and/or fold which may render the blanket surface nonuniform and resulting in poor printing results. Further, when a blanket must be replaced, the time consuming packing operation must be repeated for a new blanket.

So-called "no pack" blankets have been developed to provide a fixed interference without the need to pack the blanket. No pack blankets are manufactured to very precise gauges so that they can be installed directly onto a cylinder with the correct amount of interference. These blankets have the advantage of a one-piece construction which requires no positioning of packing paper beneath the blanket. This results in less down time for the printing equipment when an old blanket is removed and replaced with a new blanket.

Such no pack blankets, like most printing blankets, are normally composed of a base material which gives the blanket dimensional stability. Woven fabrics are preferred. The base may consist of one or more layers of such fabric. The working surface of the blanket which contacts the ink is typically an elastomeric layer of natural or synthetic rubber which is applied over the base layer or layers. The base layer or layers and working surface are laminated together using suitable adhesives.

In offset lithography as well as other printing operation, the printing plate and blanket cylinders are subject to corrosion and rust because of exposure to inks, water, and chemicals used in cleaning up the machinery. To combat such problems, these cylinders have typically been plated with chrome or nickel. These metals provide a surface that is not only corrosion resistant, but also ink repellent.

However, such nickel- and chrome-plated cylinders have not worked well in conjunction with no pack blankets. After only short periods of use, the nickel plating is removed from the cylinder surface to such an extent that uncoated steel is exposed. While chrome plating is more resistant to removal than nickel, it too is subject to wear. The areas on the cylinder surface where the plated metal is removed are then subject to rapid corrosion and/or oxidation. Some have speculated that the nickel or chrome is removed by corrosion from chemicals which wick around the edges of the printing blanket. Others have speculated that the metal removal is caused by electrical charges building up from the friction between the blanket and cylinder.

Some attempts have been made to eliminate the removal of metal platings. For example, Sporing, U.S. Pat No. 4,471,011 provides a thin rubber coating on the base of a printing blanket to restrict the wicking of solvents and other chemicals beneath the blanket. Others have applied lubricants to the blanket cylinder to prevent such solvents and chemicals from contacting the blanket cylinder. Neither of these attempted solutions has done more than to slow down the removal of metal, and the application of lubricants must be repeated each time a blanket is changed.

In any event, it would be desirable to be able to use no pack blankets, with their attendant advantages, on such plated cylinders. Accordingly, the need exists in the art a no pack printing blanket which can be used successfully in conjunction with a nickel, chrome, or other corrosion resistant metal-plated cylinder.

SUMMARY OF THE INVENTION

The present invention meets that need by providing a unitary printing blanket construction which requires no packing when installed and which has a nontextured, substantially smooth and low abrasion base surface contacting the blanket cylinder so that the pressures to which the blanket is subjected are spread substantially over the entire surface off the blanket in contact with the blanket cylinder. By a "substantially smooth" surface, we mean a surface having a measured average surface roughness, $R_a$, of less than about 200. In this manner, the metal-plated surface of the cylinder is protected from metal removal, either due to chemical corrosive action or mechanical abrasion.

In accordance with one aspect of the present invention, a laminated printing blanket construction is provided which includes at least one base ply of a woven fabric, a surface printing face layer of a polymeric material, an intermediate compressible layer positioned between the base ply and the surface layer, and a reinforcing fabric ply positioned between the compressible layer and the surface layer. The opposite surface of the base ply is coated with a natural rubber or synthetic elastomer to provide a substantially smooth surface such that, when mounted on a blanket cylinder, the pressures to which the blanket is subjected are spread substantially over the entire surface of the blanket in contact with the cylinder.

The base ply may comprise any of a number of suitable woven fabric materials such as high grade cotton yarn, rayon, nylon, aramid, or polyester. Typically the fabric will be from about 0.005 to about 0.020 inches thick and have a weight of from between about 100 to 270 gm/m$^2$. The coating of elastomer should be sufficient to completely fill the interstices between the warp and weft fibers of the fabric until the profile of the fabric weave is no longer visible. Typically, depending upon the weight and weave of the fabric used for the base ply, the coating weight for the elastomer will be between about 80 to about 400 gm/m$^2$. This provides a substantially smooth, nontextured, low abrasion surface which is in substantially complete contact with the blanket cylinder when installed thereon. This is in sharp contrast to typical prior printing blanket constructions in which only the fabric nodes (i.e., points of crossover between weft and warp threads) actually contacted the cylinder surface. Typically, such areas of contact would comprise only approximately 20% of the total surface area of the blanket.

In another embodiment of the invention, a laminated printing blanket construction is provided including at least one base ply and a reinforcing fabric ply laminated together, a surface layer of an elastomeric material laminated to the surface of the reinforcing fabric ply opposite the base ply, and a natural rubber or synthetic elastomer coated onto the surface of the base ply opposite the reinforcing fabric layer to provide a substantially smooth surface for the blanket such that, when mounted on a blanket cylinder, the pressures to which the blanket is subjected are spread substantially over the entire surface of the blanket in contact with the cylinder. Optionally, the blanket may include an intermediate compressible layer positioned between the base ply and the reinforcing fabric ply.

The printing blanket may be initially fabricated to a thickness which is in excess of the final required thickness. The exterior surface of the base ply may then be ground to be substantially smooth and nontextured. Alternatively, the elastomer on the base ply may be built up and cured against a smooth surface, and the surface layer ground to provide the correct gauge for the blanket. Alternatively, the exterior surface of the base ply may be ground first, followed by the grinding of the top working surface layer to provide a final blanket construction of the precise thickness (gauge).

It has been found that the use of printing blankets having woven fabric base plies mounted directly onto metal-plated blanket cylinders causes removal of metal through an abrasion process of the fiber nodes rubbing against the cylinder surface. Because a typical blanket base ply is in contact with the blanket cylinder surface over only approximately 20% of its surface area at the fiber nodes where warp and weft threads crossover, the pressures to which the printing blanket is exposed are concentrated in these areas of contact. By providing a substantially smooth, nontextured base ply surface for the printing blanket, the blanket is in substantially complete contact with the cylinder surface, and the pressures to which the blanket is subjected are spread over substantially the entire surface of the blanket in contact with the cylinder. This minimizes abrasive removal of metal platings on the blanket cylinders on which such blankets are mounted, thereby reducing corrosion of such cylinders.

Accordingly, it is an object of the present invention to provide a unitary printing blanket construction which requires to packing when installed and which has a nontextured, substantially smooth and low abrasion base surface contacting the blanket cylinder. This, and other objects and advantages of the present invention, will become apparent from the following detailed description, the accompanying drawings, and the appended claims.

DETAILED DESCRIPTION OF THE PREFERRED EMBODIMENTS

Figure 1:
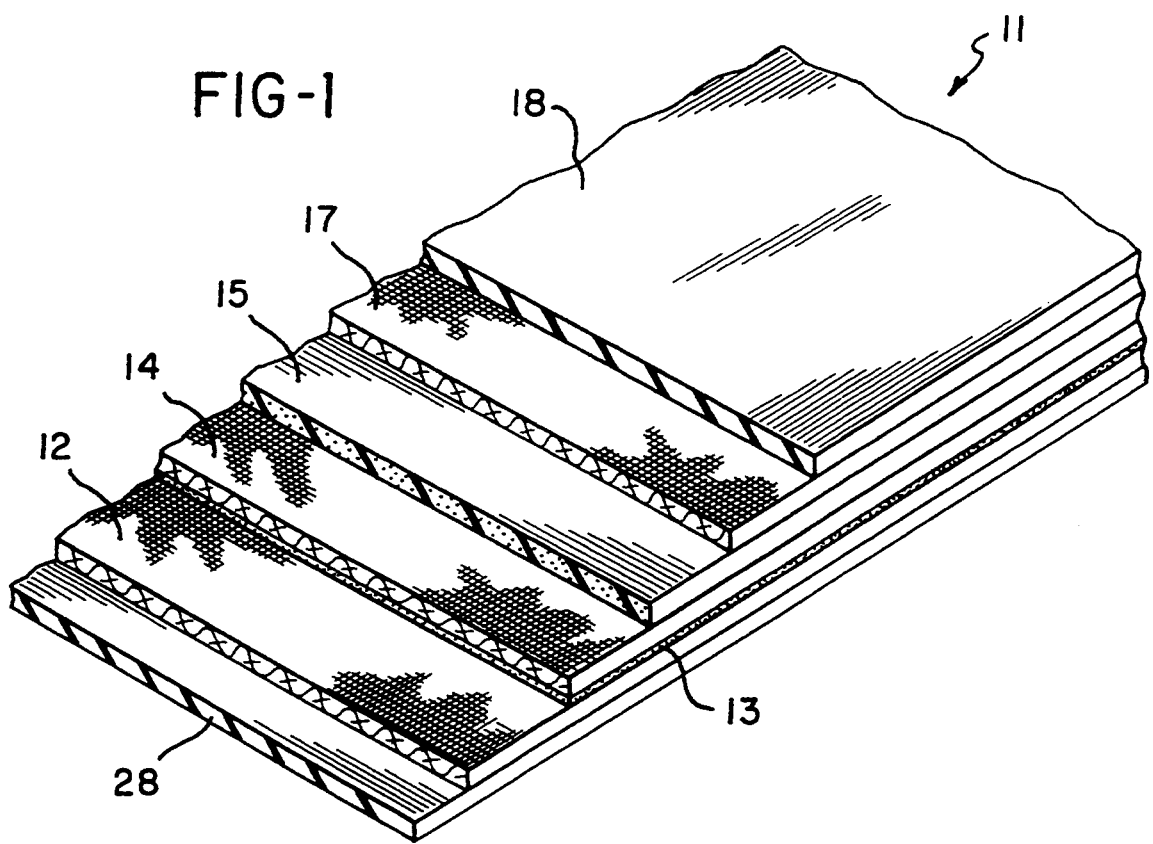
FIG. 1 is an isometric view of a segment of the printing blanket of the present invention.

One embodiment of the printing blanket 11 of the present invention is illustrated in FIG. 1 and includes a base ply 12 of woven fabric. As is conventional in the art, an additional ply or plies of reinforcing fabric such as plies 14 and 17 are also included in the laminate construction. Typically, the fabric plies are low stretch fabrics such as certain types of cotton, rayon, nylon, polyester, aramid, or glass. Typically the fabric will be from about 0.005 to about 0.020 inches thick, preferably from about 0.010 to about 0.016 inches thick, and have a weight of from between about 3 oz/yd$^2$ to about 8 oz/yd$^2$ (from about 100 to about 270 gm/m$^2$). In the normal manufacturing process, the plies are formed of a long band of fabric. Plies 12 and 14 may be bonded together by an adhesive layer 13 which may be a neoprene rubber cement or other suitable adhesive material.

As illustrated in FIG. 1, blanket 11 includes a compressible intermediate layer 15 which may be formed by any of a number of conventional processing techniques. Another reinforcing ply of fabric 17, similar in construction to plies 12 and 14, is positioned over compressible layer 15.

Surface layer 18 is typically formed from any suitable elastomeric material which can be cured or finished to present a smooth, ink receptive surface, including both natural and synthetic rubbers. For example, some elastomeric compounds that have been used in the art for forming surface layer 18 include acrylonitrile butadiene rubber, isobutylene isoprene elastomer, polysulfide rubber, ethylene propylenediene terpolymer, natural rubber, styrene butadiene rubber, and a blend of acrylonitrile-butadiene and polysulfide rubbers.

Surface layer 18 may be formed in a conventional manner by mixing an unvulcanized rubber compound in a suitable solvent and subsequently knife coating the solution onto a fabric carcass such as fabric layer 17. Typically, the application is made in a plurality of thin coats to build up the thickness of the layer. After each coat is applied, the solvent is allowed to evaporate so that the resultant elastomeric layer is substantially solvent free.

The exterior surface of base ply 12 is coated with a natural or synthetic elastomer 28 to provide the substantially smooth, low abrasion surface which will contact the blanket cylinder. The coating of elastomer should be sufficient to completely fill the interstices between the warp and weft fibers of the fabric until the profile of the fabric weave is no longer visible. Typically, depending upon the weight and weave of the fabric used for the base ply, the coating weight for the elastomer will be between about 80 to about 400 gm/m². If less than about 80 gm/m² of elastomer is used, it has been found that the weave of the base ply of the fabric remains visible, and the surface roughness of the fabric is at an unacceptably high level to obtain the desired substantially smooth, low abrasion surface. Greater than about 400 gm/m² of elastomer may be applied. However, excess material may then be ground off or otherwise removed to produce a printing blanket of a desired precise gauge. Suitable elastomers include those elastomers described above for use in the surface layer of the blanket.

A preferred technique for coating the base ply 12 is to coat, such as by knife coating, a series of layers of the elastomer in a solvent and evaporate the solvent after each layer is coated. Higher solids content solvent and rubber coatings are preferred. Dipping of the fabric into a solution of solvent and elastomer is not preferred as the fabric will not pick up sufficient elastomeric material in low solids-content solutions; repeated dippings in low solids content solutions or dipping in a high solids content solution will build up the thickness of elastomer, but do not produce a smooth surface.

During the application of the elastomer-in-solvent by knife coating, the elastomer will penetrate into the surface of the weave of the base ply and start to fill the interstices thereof. After several layers have been built up, typically from 4 to 8 layers, a sufficient thickness of elastomer 28 will be coated thereon to substantially completely cover the woven fibers in the base ply 12 and provide the necessary substantially smooth surface. It has been found that it is sufficient to coat with elastomer 28 until the thickness of the fabric base ply is increased by at least about 0.002 inches greater than the initial thickness of the fabric.

Printing blanket 11 is then heated for a suitable period of time to vulcanize or cure the unvulcanized rubber in the construction. Blanket 11 may be formed initially in a long roll or the like from which individual blankets may be cut to size.

The printing blanket 11 may be initially fabricated to a thickness which is in excess of the final required thickness. The elastomer 28 on the exterior surface of base ply may then be ground to be substantially smooth and nontextured. A suitably smooth surface is one in which the measured average surface roughness, $R_a$, is less than about 200, and preferably less than about 165. Average roughness is a measure of the average absolute value of the profile of deviation from a mean line on a surface. Conventional surface roughness measuring devices which are known in the art may be used. Alternatively, the elastomer on the base ply may be built up and cured against a smooth surface, and the surface layer ground to provide the correct gauge for the blanket. suitably smooth curing surfaces are known in the art and include smooth papers. Alternatively, the exterior surface of the base ply may be ground first, followed by the grinding of the top working surface layer to provide a final blanket construction of the precise thickness (gauge).

Figure 2:
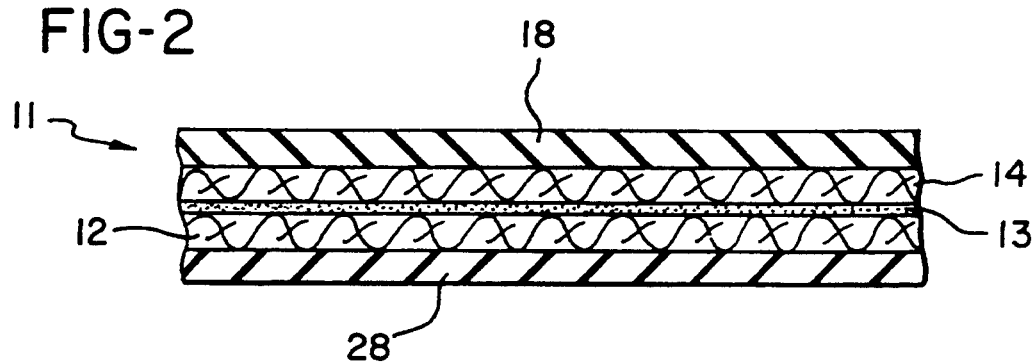
FIG. 2 is a fragmentary cross-sectional view of another embodiment of the invention.

Another embodiment of the invention is illustrated in FIG. 2. In that embodiment, a surface layer 18 is laminated to a fabric reinforcing ply 14 while base layer 12 is coated or otherwise laminated with a layer 28 of a natural or synthetic elastomer to provide an exterior surface which is substantially smooth and nontextured. Plies 12 and 14 may be bonded together by an adhesive layer 13 which may be a neoprene rubber cement or other suitable adhesive material. Again, to insure that a substantially smooth and nontextured surface is presented, the thickness of layer 28 should be sufficient so that no fabric pattern from base layer 12 is exposed.

Through the use of an elastomer coated fabric which has a substantially smooth, nontextured surface as the base ply of a printing blanket construction, removal of plated metals from the surface of the blanket cylinder in a printing operation is essentially eliminated. This, in turn, eliminates those corrosion problems which have plagued the art in the past.

In order that the invention may be more readily understood, reference is made to the following examples, which are intended to be illustrative of the invention, but are not intended to be limiting in scope.

EXAMPLE 1

An uncoated fabric woven from a cotton/rayon blend was selected as a typical fabric used as a base ply in printing blanket constructions. The fabric had a dry weight of 215.77 gm/m² and a thickness of 0.015±0.0004 inches. The average surface roughness, $R_a$, of the fabric was measured with a surface roughness analysis device and was found to be 920. Samples cut from this fabric were used in all subsequent tests.

Several samples of fabric were immersed in a nitrile rubber cement, removed, and then air dried for 1 hour at 140° F. The conditions, solids; content of the rubber, weight increase, and gauge increase of the fabric is reported in Table I below.

TABLE I

| Sample # | % Solids Content of Rubber | Weight Increase (gm/m²) | Gauge Increase (in.) | Comments |
| --- | --- | --- | --- | --- |
| 1 | none | none | none | Fabric surface plainly visible; surface rough |
| 2 | 3% | 5.59 | 0.0003 | Fabric surface plainly visible; surface rough |
| 3 | 3% | 4.71 | 0.0002 | Excess cement removed by lightly scraping both sides of fabric; fabric surface plainly visible; surface rough |
| 4 | 5% | 11.52 | 0.0003 | Fabric surface plainly visible; surface rough |
| 5 | 5% | 10.99 | 0.0002 | Excess cement removed by lightly scraping both sides of fabric; fabric surface plainly visible; surface rough |
| 6 | 10% | 39.66 | 0.0007 | Fabric surface plainly visible; surface rough; fabric had rubbery feel |
| 7 | 10% | 33.52 | 0.0005 | Excess cement removed by lightly scraping both sides of fabric; fabric surface plainly visible; surface rough; fabric had rubber feel |
| 8 | 30% | 187.37 | 0.0024 | Parts of surface covered by blotches by rubber; unusable to produce printing blanket |
| 9 | 30% | 82.31 | 0.0009 | Excess cement removed |

TABLE I-continued

| Sample # | % Solids Content of Rubber | Weight Increase (gm/m²) | Gauge Increase (in.) | Comments |
|---|---|---|---|---|
| | | | | by lightly scraping both sides of fabric; fabric weave still visible. |

As can be seen from Table I, dipping of the fabric in a low solids content rubber solution does not produce a fabric with sufficient rubber coated onto the surface to provide the substantially smooth surface of the present invention. Even dipping in relatively high (i.e., 30%) solids content solutions does not produce the necessary substantially smooth surface.

EXAMPLE 2

In comparison with the samples in Example 1, the samples in this example were prepared using the same fabric as in Example 1, but were coated on a single side with a 37% solids nitrile rubber using a knife. Again, the samples were air dried, this time at room temperature except for the last coat which was dried at 140° F. for 1 hour.

Sample 10—Three coats of approximately 0.002 inch thickness (wet) nitrile rubber were applied to the fabric. A weight increase of 170.35 gm/m² and a gauge increase of 0.0041 in. were measured. While the rubber coated the entire surface of the fabric, the weave of the fabric was still visible.

Sample 11—Eight coats of approximately 0.002 inch thickness (wet) nitrile rubber were applied to the fabric. A weight increase of 323.92 gm/m² and a gauge increase of 0.0079 in. were measured. The fabric surface was entirely covered by the rubber, and the pattern of the underlying fabric was completely hidden.

Sample 12—One coat of approximately 0.002 inch thickness (wet) nitrile rubber were applied to the fabric. A weight increase of 35.95 gm/m² and a gauge increase of 0.0009 in. were measured. The fabric weave was clearly visible.

Sample 13—Two coats of approximately 0.002 inch thickness (wet) nitrile rubber were applied to the fabric. A weight increase of 79.33 gm/m² and a gauge increase of 0.0013 in. were measured. The fabric weave was clearly visible.

EXAMPLE 3

A printing blanket was manufactured in accordance with the present invention with a substantially smooth, low abrasion surface coated onto the base fabric ply. Sixteen coats of a 37% solids content nitrile rubber were coated onto the fabric ply. The weight increase was measured to be in excess of 300 gm/m², and the gauge increase was 0.010 in. After curing, the coated base ply surface was ground down to a thickness of approximately 0.005 in. A surface roughness measurement was made and found to be $R_a = 134$.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A laminated printing blanket comprising at least one base ply of a woven fabric, a surface printing face layer of a polymeric material, an intermediate compressible layer positioned between said base ply and said surface layer, and a reinforcing fabric ply positioned between said compressible layer and said surface layer, and wherein the opposite surface of said base ply is coated with a natural rubber or synthetic elastomer at a coating weight of from about 80 to about 400 gm/m² to provide a substantially smooth surface such that, when mounted on a blanket cylinder, the pressures to which the blanket is subjected are spread substantially over the entire surface of said blanket in contact with said cylinder.

2. The printing blanket of claim 1 in which said elastomer surface has an average surface roughness of less than about 200.

3. The printing blanket of claim 1 in which said elastomer on said base ply is of a sufficient thickness that the profile of the weave of said fabric in said base ply is not visible.

4. The printing blanket of claim 1 in which said elastomer on said base ply is coated to a thickness of at least about 0.002 inches greater than the initial thickness of said fabric.

5. A laminated printing blanket comprising at least one base ply of a woven fabric and a reinforcing fabric ply laminated together, a surface layer of a polymeric rubber material laminated to the surface of said reinforcing fabric ply opposite said base ply, and a natural rubber or synthetic elastomer coated onto the surface of said base ply opposite said reinforcing fabric layer at a coating weight of from about 80 to about 400 gm/m³ to provide a substantially smooth surface for said blanket such that, when mounted on a blanket cylinder, the pressures to which said blanket is subjected are spread substantially over the entire surface of said blanket in contact with said cylinder.

6. The laminated printing blanket of claim 5 including an intermediate compressible layer positioned between said base ply and said reinforcing fabric ply.

7. The laminated printing blanket of claim 5 in which said elastomer surface has an average surface roughness of less than about 200.

8. The laminated printing blanket of claim 5 in which said elastomer on said base ply is of a sufficient thickness that the profile of the weave of said fabric in said base ply is not visible.

9. The laminated printing blanket of claim 5 in which said elastomer on said base ply is coated to a thickness of at least about 0.002 inches greater than the initial thickness of said fabric.

* * * * *

UNITED STATES PATENT AND TRADEMARK OFFICE
CERTIFICATE OF CORRECTION

PATENT NO. : 5,366,799
DATED : November 22, 1994
INVENTOR(S) : Pinkston et al.

It is certified that error appears in the above-identified patent and that said Letters Patent is hereby corrected as shown below:

Column 1,
Line 48, "stirface of the cylinder" should be -- surface of the cylinder --.

Column 2,
Line 12, "operation," should be -- operations, --.
Line 46, "exists in the art a" should be -- exists in the art for a --.
Line 58, "surface off the blanket" should be -- surface of the blanket --.

Column 4,
Line 11, "requires to packing" should be -- requires no packing --.

Column 5,
Line 63, "suitably" should be -- Suitably --.

Column 6,
Line 4, "rubber feel" should be -- rubbery feel --.

Signed and Sealed this

Eleventh Day of December, 2001

Attest:

NICHOLAS P. GODICI
Attesting Officer      Acting Director of the United States Patent and Trademark Office